Feb. 12, 1924.
W. H. WYLAND
1,483,259
TRANSMISSION BAND
Filed Aug. 21, 1922        2 Sheets-Sheet 1
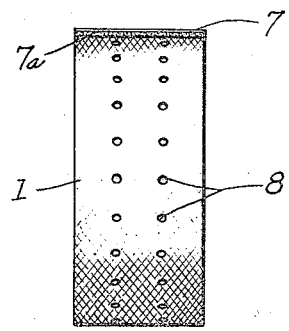
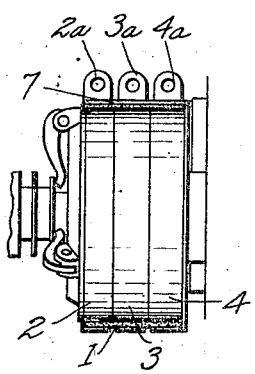
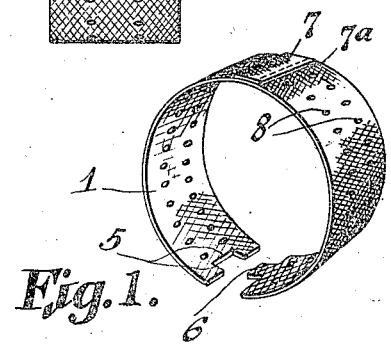
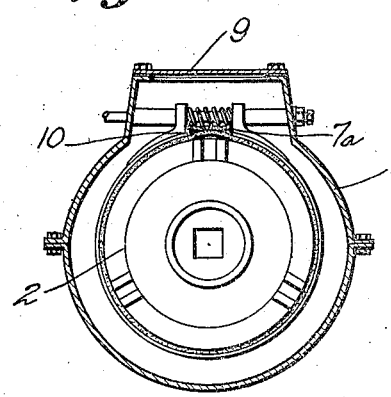
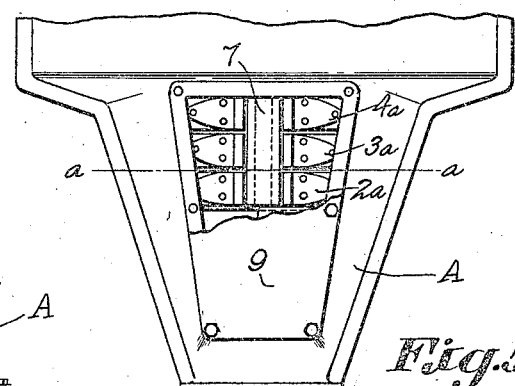
William H. Wyland
INVENTOR
BY Victor J. Evans
ATTORNEY Feb. 12, 1924.   1,483,259
W. H. WYLAND
TRANSMISSION BAND
Filed Aug. 21, 1922    2 Sheets-Sheet 2
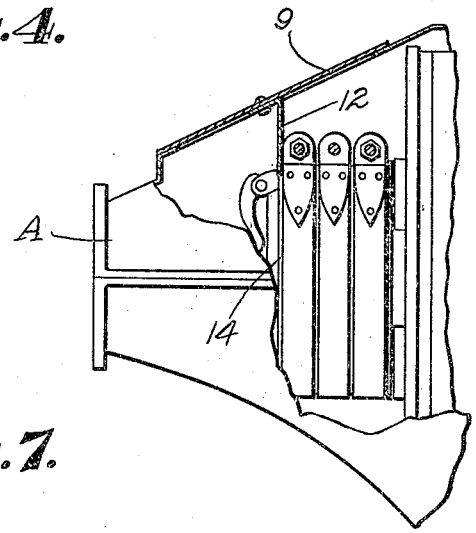
Fig. 4.
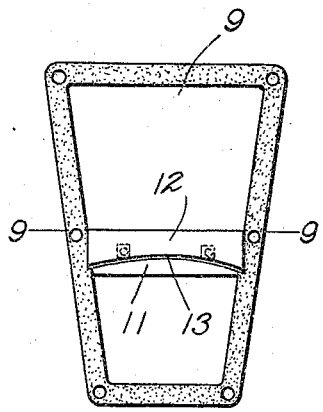
Fig. 7.
Fig. 8.
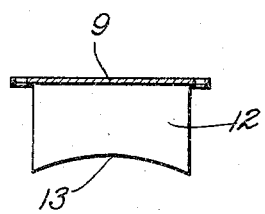
Fig. 9.
William H. Wyland
INVENTOR
BY Victor J. Evans
ATTORNEY Patented Feb. 12, 1924.

1,483,259

UNITED STATES PATENT OFFICE.

WILLIAM HOWARD WYLAND, OF SIDNEY, OHIO.

TRANSMISSION BAND.

Application filed August 21, 1922. Serial No. 583,349.

*To all whom it may concern:*

Be known that I, WILLIAM H. WYLAND, a citizen of the United States, residing at Sidney, in the county of Shelby and State of Ohio, have invented new and useful Improvements in Transmission Bands, of which the following is a specification.

My present invention relates generally to a unitary transmission band lining for use particularly in combination with the bands and drums of an automobile transmission whose gripping function necessitates replacement of the friction linings from time to time and whose forked lugs as most commonly constructed are non-removable with respect to the bands, or if removable, as has been proposed, subject the bands to a chattering or undesirable vibration in use and frequently become accidentally displaced.

The primary object of the invention is to provide a simple, easily applied and efficient transmission band lining designed more particularly for use in conjunction with the bands and drums of a transmission used on an automobile of a well known type, so that the compression of any of the bands will be attended by the creation of adequate friction between the unitary lining band and the drum complementary to said band, and this is accomplished without the unitary lining affecting the other drum.

Another object is to provide a lining which can be placed on and removed from the drums without disconnecting any of the transmission parts except the top or cover plate of the housing, and adjusting of the connecting bolts between the lugs, this procedure involving a minor expense due to time and labor consumed.

A further object is to provide a lining which is adapted to be slipped onto or off of the drums which has means combined with it whereby the lining becomes retained between the bands and drum in a manner to prevent displacement while in use.

A further object is the provision of a lining which is so constructed and mounted that rivets or similar elements are dispensed with aiding greatly to the elimination of the chattering before mentioned.

A still further object is the provision of intermediate parallel rows of perforations extending circumferentially of the lining to permit a free flow of oil therethrough, and also providing flexibility to the lining.

With the above objects in view, my invention consists in the novel construction and arrangement of parts to be hereinafter fully and specifically described and illustrated in the accompanying drawings, in which:

Figure 1 is a perspective view of my novel lining, per se.

Figure 2 is an elevation of the lining band.

Figure 3 is a sectional view disclosing the arrangement of the lining relative to the drums and bands of the transmission.

Figure 4 is a fragmentary vertical section through the transmission housing showing the bands and associated parts, and a part of my invention applied.

Figure 5 is a plan view with the band or cover plate removed to expose the drums and their associated parts, and showing the band lining constructed in accordance with my invention applied thereto.

Figure 6 is a view in cross section on line *a—a* of Figure 5.

Figures 7 and 8, and 9 are respectively a plan, side, and cross sectional view of the cover plate embodying part of my invention.

Referring to the drawings, 1 designates my novel unitary band which is preferably formed, though not necessarily, of textile material, and it is of a width equal to the combined width of the plural drums 2, 3, and 4, of the transmission shown and it is therefore thought to be unnecessary to describe the same, except to say that it comprises a casing A, the brake drum 2, the low speed drum 3 and the reverse drum 4, and the bands $2^a$, $3^a$ and $4^a$ complementary to the drums 2, 3 and 4 respectively and designed to be operated in the ordinary well known manner. At one end the lining 1 is bifurcated as indicated at 5 while the other end is provided with a projecting tongue 6 which interlocks or engages the joint 5 when the lining is applied. The lining is also provided with a transverse lug abutment plate 7 of the textile material used to form the lining, which is secured thereto by intermediate rows of rivets or stitchings thereby leaving the edges $7^a$ free, for a purpose to be presently explained. Parallel rows of perforations 8 are provided in the lining to permit a free flow of oil to the lining and also to permit greater flexibility when compressed upon the drums, and permitting easier operation of the reverse and brake drums if the lining should be formed without this feature.

In applying my lining 1 it is simply necessary to remove the cover plate 9, adjust the nuts upon the operating rods which will consequently permit loosening of the springs and lateral movement of the bands. The lining is then placed into position by inserting the ends thereof upon each side of the drums, the flexibility allowing the same to be easily moved endwise into position, and when completely encircling the drums the joints 5 and 6 will become interlocked. The abutment 7 is centrally arranged within and in contact with the compressing lugs, with the projection 10 of said lugs beneath and impinging upon the free edges 7ª. The lining is held in this position, and the cover plate 9 which carries an L-shaped plate 11 is replaced and fastened in position. The plate 11 functioning to prevent endwise movement of the lining due to the extension 12 being contiguous to the band 2ª, and the semi-circular face 13 of the extension bridging the drum extension 14.

The usual transmission elements are not modified in any manner to accommodate my improved lining, and it is not deemed necessary to describe the operation or operating elements of the transmission which is well-known.

In operation, it will be noted that movement of the compressing levers causes consequent movement of the compressor lugs, which are in contact with the edges 7ª of the abutment 7, and that the conventional construction of any one of the bands 2ª, 3ª or 4ª will enable the lining 1 to adequately hold against turning the drum of the contracted band, and this without affecting the other drums, notwithstanding the interposition of the single lining between the drums and their respective bands. The joints 5 and 6 permit separation due to contraction, and allows slight movement of the lining upon the drums, and prevents the sudden "grabbing" to which the linings are usually subjected, thereby distributing the wear more evenly upon the lining. This creeping movement permits a gradual but firm hold to be had upon application of the lining upon the drum.

The lubricating openings 8 add to the efficiency, being so arranged as to permit the circulation of oil to the lining and drums, thereby preventing undue wear of the lining and the chatter of the same during the operation thereof.

From the foregoing description it can be seen that an improved type of transmission lining has been provided which is efficient in use, and will effectively prevent burning of the lining and permits its ready application to the drum, and eliminates all chatter that usually occurs in transmission of this character.

Changes in details may be made without departing from the spirit or scope of my invention.

I claim:

1. As a new article of manufacture, a transmission band lining of a width equal to the combined widths of the drums of a transmission and equipped at its meeting edges with an interlocking joint, the said lining being adapted to be slipped into position between the perimeters of the drums and their complementary bands.

2. As a new article of manufacture, a transmission band lining of a width equal to the combined widths of the drums of a transmission, one edge thereof being bifurcated to provide spaced tabs adapted to receive a tongue projecting from the other edge, the said lining being adapted to be slipped into position between the perimeters of the drums and their complementary bands, and being provided with circumferentially extending apertures as and for the purpose specified.

3. As a new article of manufacture, a transmission band lining of a width equal to the combined widths of the drums of a transmission, equipped upon its upper edge with a lengthwise lug abutment plate.

4. As a new article of manufacture, a transmission band lining of a width equal to the combined widths of the drums of a transmission, equipped upon its upper edge with a lengthwise extending lug abutment plate, said plate having its central portion secured to the lining, and its edges in contact with the compressing lugs.

5. As a new article of manufacture, a transmission band lining of a width equal in width to the combined widths of the drums of a transmission, and equipped lengthwise of its upper edge with means to be engaged by the compressing lugs, said means being movable when engaged by said lugs.

6. As a new article of manufacture, a transmission band lining of a width equal in width to the combined widths of the drums of a transmission, and equipped lengthwise of its upper edge with means to be engaged by the compressing lugs, said means being movable when engaged by said lugs, said movement causing separation of the lining joint and consequent slight movement of the lining when contracted.

7. As a new article of manufacture, a transmission band lining of a width equal to width to the combined widths of the drums of a transmission, and equipped lengthwise of its upper edge with means to be engaged by the compressing lugs, said means being movable when engaged by said lugs, said movement causing separation of the lining joint and consequent slight movement of the lining when contracted, and inter-engagement of the joint upon retraction of the elements.

8. As a new article of manufacture, a transmission band lining of a width equal in width of the combined widths of the drums of the transmission and equipped lengthwise of its outer central portion with means to be engaged by the operating elements, a joint to permit separation of said lining, the said lining being adapted to be slipped into position between the perimeters of the drums and their complementary bands, and means carried upon the housing cover plate contiguous to said bands to prevent axial movement of said lining.

9. As a new article of manufacture, a transmission band lining of a width equal in width of the combined widths of the drums of the transmission and equipped lengthwise of its outer central portion with means to be engaged by the operating elements, a joint to permit separation of said lining, the said lining being adapted to be slipped into position between the perimeters of the drums and their complementary bands, and means carried upon the housing cover plate contiguous to said bands to prevent axial movement of said lining, said means comprising an L-shaped plate extending rearwardly of the lining and contiguous to one of said drums.

In testimony whereof I affix my signature.

WILLIAM HOWARD WYLAND.